April 28, 1959  D. E. KENYON  2,884,523
DECODER CIRCUIT FOR TELEDATA SYSTEM
Original Filed Nov. 19, 1946  5 Sheets-Sheet 1
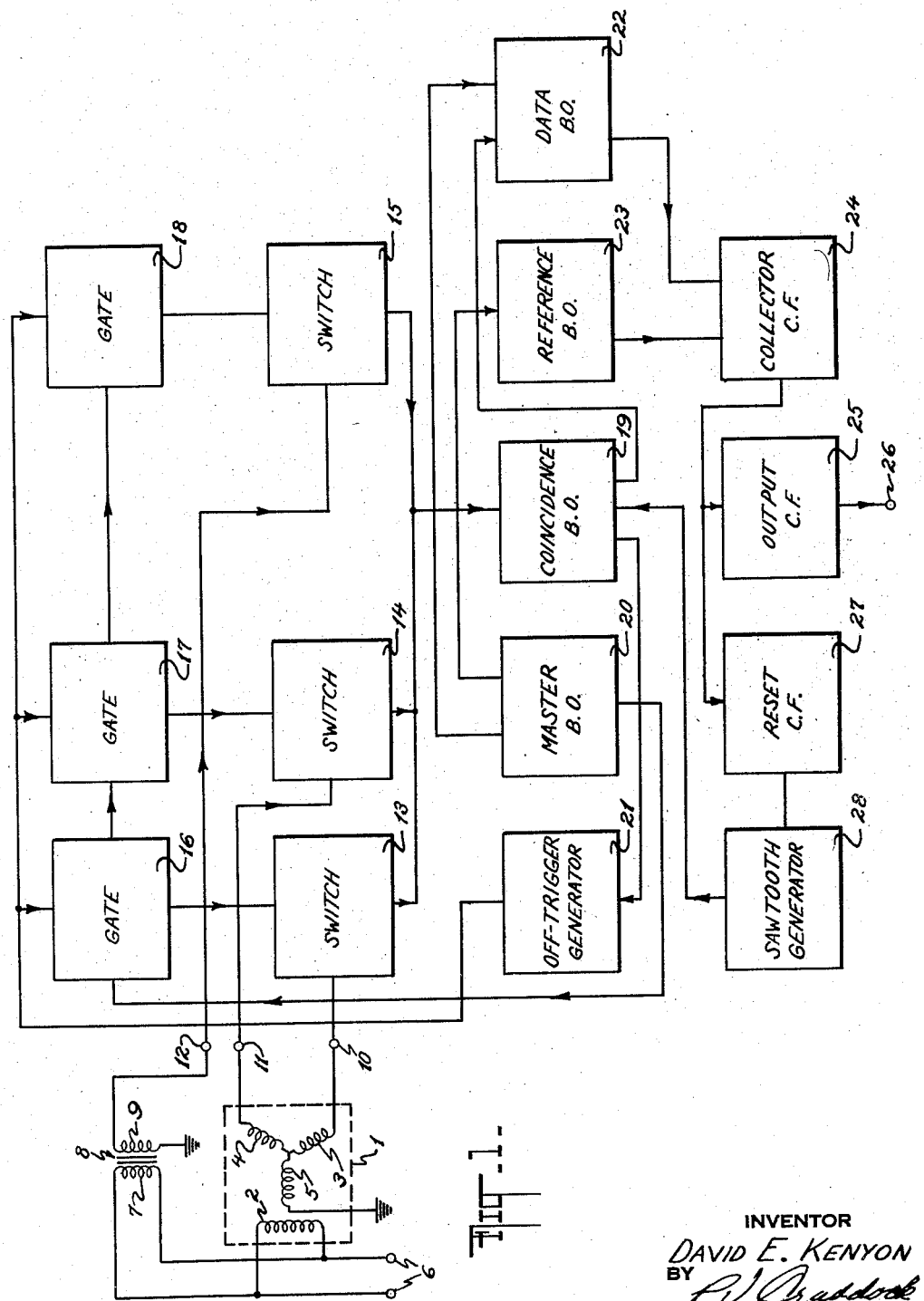
INVENTOR
DAVID E. KENYON
BY
ATTORNEY April 28, 1959
D. E. KENYON
2,884,523
DECODER CIRCUIT FOR TELEDATA SYSTEM
Original Filed Nov. 19, 1946
5 Sheets—Sheet 2
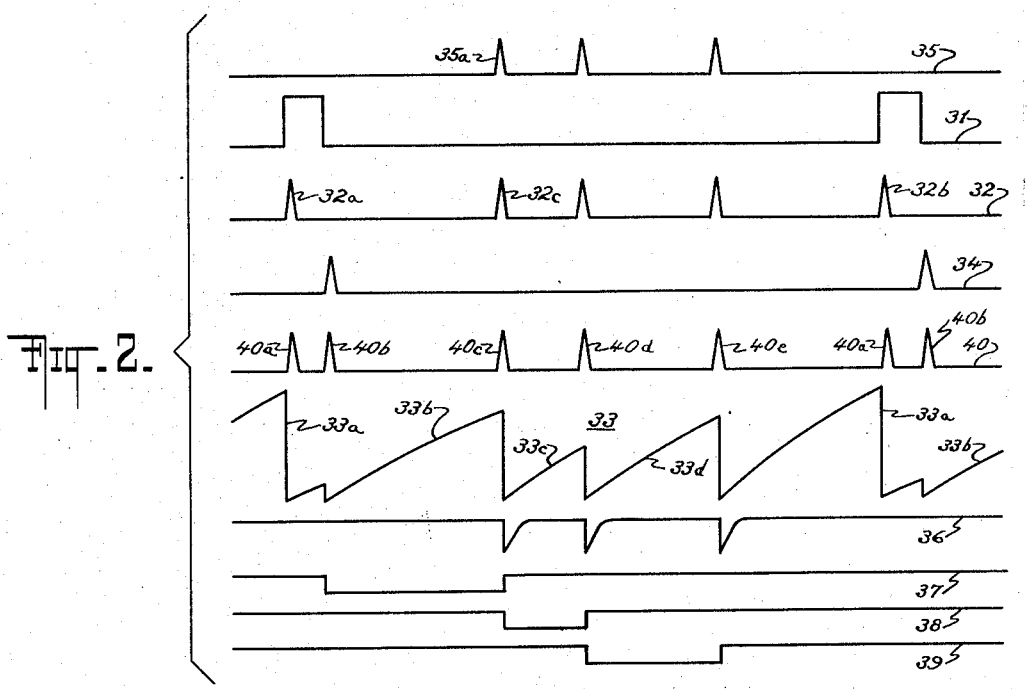
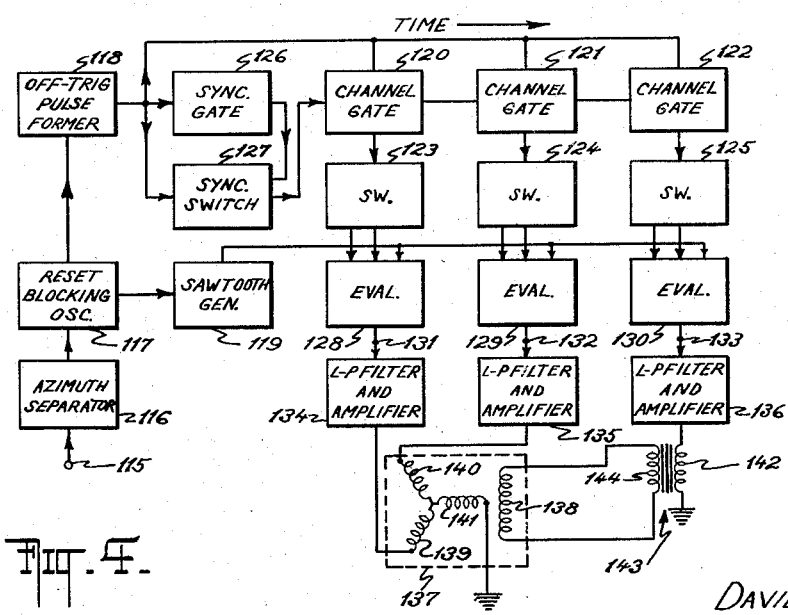
INVENTOR
DAVID E. KENYON
BY
ATTORNEY

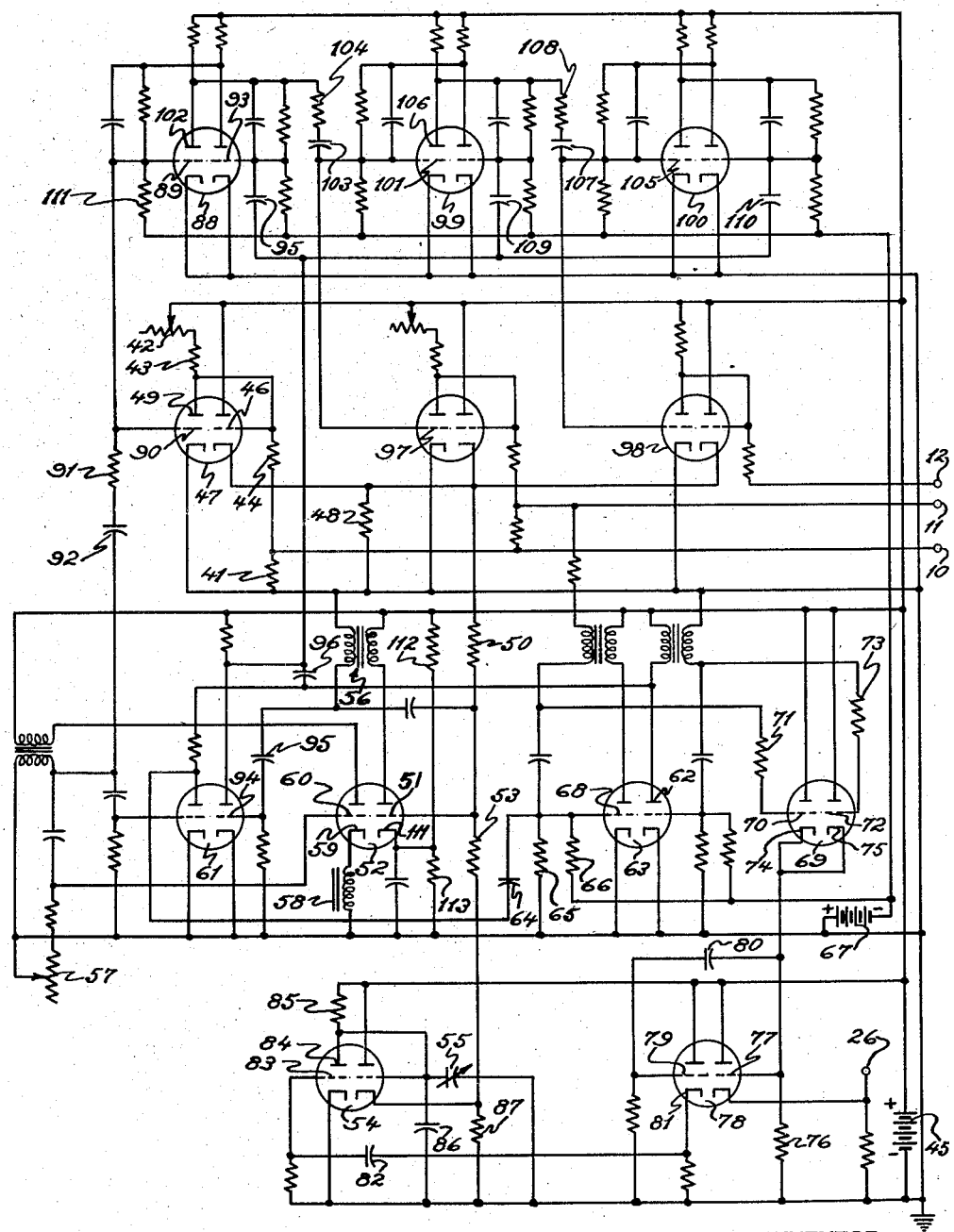
Fig-3-

April 28, 1959 D. E. KENYON 2,884,523
DECODER CIRCUIT FOR TELEDATA SYSTEM
Original Filed Nov. 19, 1946 5 Sheets-Sheet 4

INVENTOR
DAVID E. KENYON
BY
ATTORNEY

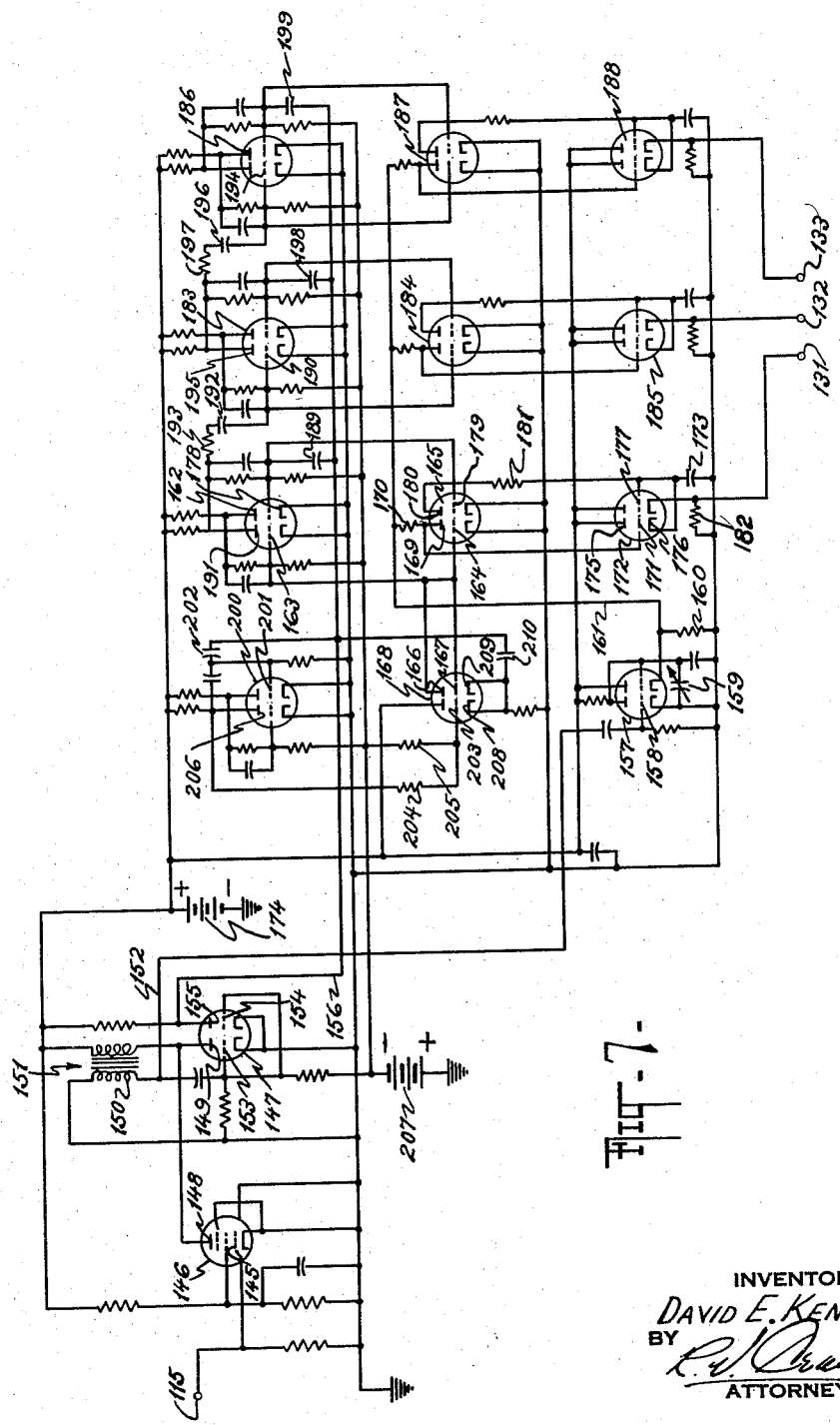

United States Patent Office 2,884,523
Patented Apr. 28, 1959

2,884,523

DECODER CIRCUIT FOR TELEDATA SYSTEM

David E. Kenyon, Huntington, N.Y., assignor to Sperry Rand Corporation, a corporation of Delaware Original application November 19, 1946, Serial No. 710,781, now Patent No. 2,736,007, dated February 21, 1956. Divided and this application July 1, 1955, Serial No. 519,436

12 Claims. (Cl. 250—27)

This invention relates in general to teledata systems, and more particularly to such systems adapted for transmitting information regarding the rotational position of a pivoted member with respect to a base, to a location remote therefrom. This application is a division of application Serial No. 710,781, filed November 19, 1946 now Patent No. 2,736,007.

In certain radio detection and ranging or radar systems, a scanner is mounted on a base by means of a vertically disposed pivot, and is free to rotate about this pivot. An indicator is provided at which it is desirable to show at any given instant the angular position of the radar scanner. Since the indicator is preferably located at a point remote from the scanner, means must be provided whereby information regarding the instantaneous angular position of the radar scanner in azimuth may be transmitted to the remotely located indicator which may, for example, be of the plan position type comprising a cathode-ray tube in which a radial trace is caused to revolve in synchronism with the azimuthal rotation of the radar scanner. The teledata system of the present invention is especially adapted, but not limited, to use in such a radar system for linking the scanner with the indicator.

One method of conveying rotational information over an appreciable distance utilizes a pair of selsyn transformers each having a single rotor winding and three stator windings. If the rotor windings are energized by the same alternating reference voltage, and if the stator windings have their terminals respectively connected together, rotational displacements of the rotor at the transmitting end will be accurately reproduced by corresponding rotational displacements of the rotor at the receiving end. It is possible to employ one side of the circuit carrying the reference voltage as one of the three connections between the respective transmitter and receiver stator windings. With this circuit arrangment, only four wires are necessary between the transmitter and receiver, and complete information is conveyed by three voltages.

It is often desirable to introduce a radio link between the radar system and its associated indicator unit. Even if the connections described just above are employed, it would be necessary that the radio link provide three channels for the purpose of transmitting rotational information between the transmitting and receiving ends of the system. Such an arrangement would necessarily be cumbersome and expensive, and sufficient precision would be extremely difficult to achieve.

An object of the present invention is to provide an improved teledata system which is capable of transmitting full rotational information over a single communication channel.

A further object of the present invention is to provide, in the pulse-time modulation link of a teledata system, an improved means for decoding the transmitted information.

Another object of the present invention is to provide an improved means for producing an electrical quantity which is a function of the space between successive signals.

A further object is to provide a novel circuit for controlling the charge and discharge of a condenser.

A further object of the present invention is to provide improved apparatus and instrumentalities embodying novel features and principles, adapted for use in realizing the above objects and also adapted for use in other fields.

In accordance with the invention of the above-identified patent application, there is provided a teledata system utilizing transmitting and receiving selsyn transformers each having three stator terminals, and coding means at the transmitting end for producing a series of relatively short pulses which are respectively modulated in time displacement with respect to a synchronizing pulse group and to each other as a function of the instantaneous values of the output voltages of the transmitting selsyn transformer. Means are provided at the receiving end for decoding the above-mentioned series of intelligence pulses to provide a plurality of voltages adapted to energize the receiving selsyn transformer and thereby to reproduce at the receiving end the rotational displacement of the rotor of the selsyn transformer at the transmitting end.

In the ordinary method of pulse-time modulation, intelligence is transmitted by a series of pulses of constant amplitude and duration, the time displacement of each successive pulse being varied directly in accordance with the corresponding modulating voltage. Synchronization between transmitter and receiver is achieved by cyclically transmitting a synchronizing pulse. As is well known, pulse-time modulation provides definite advantages over other forms of modulation, particularly with respect to the signal-to-noise ratio. In accordance with the present invention, this method of modulation is utilized to provide not only its well-known advantages, but also to realize, by certain modifications in the conventional mode of operation, additional advantages not previously attained.

One important feature of the present invention is that the time displacement of each intelligence pulse with respect to the preceding pulse need not be a linear function of the signal or modulating voltage corresponding to that pulse. As a matter of fact, in practice in connection with certain radar systems having military applications, it has been found that secrecy may be substantially enhanced by deliberately utilizing a nonlinear function, as for example, by utilizing an exponential function.

The invention in another of its aspects relates to novel features of the instrumentalities described herein for achieving the principal objects of the invention and to novel principles employed in those instrumentalities whether or not these features and principles are used for the above principal objects or in the stated field.

The above and other objects and features of the invention will be better understood by reference to the following description taken in connection with the accompanying drawings, in which like components are designated by like reference numerals and in which:

Fig. 1 represents, partly in block form, a coder and associated apparatus for use at the transmitting end of a teledata system;

Fig. 2 shows graphically, to a common time base, the type of signals developed at various points in the coder of Fig. 1;

Fig. 3 is a schematic circuit diagram of the portion of the coder of Fig. 1 represented by blocks 13–25, 27 and 28;

Fig. 4 represents, partly in block form, a decoder and associated apparatus for use at the receiving end of a teledata system;

Fig. 7 is a schematic circuit diagram of the decoder of Fig. 4.

Figure 5:
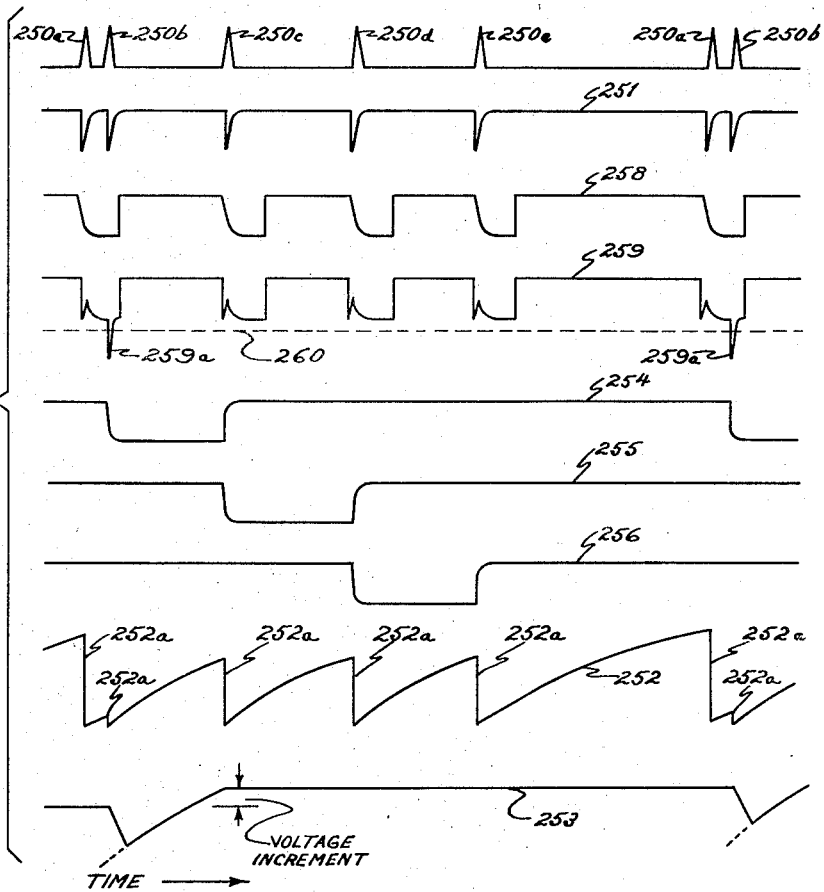
Figs. 5 and 6 show graphically the type of signals developed at various points in the decoder of Fig. 4.

Referring to Fig. 1, there is shown a selsyn transformer 1 having a rotor winding 2 and three stator windings 3, 4 and 5. Rotor winding 2 is connected to a pair of terminals 6 which in turn may be connected to any suitable source of alternating current, not shown. Terminals 6 are also connected to the primary winding 7 of a transformer 8 having a secondary winding 9.

Stator windings 3, 4 and 5 are shown as being Y-connected, the open end of winding 3 being connected to terminal 10, that of winding 4 being connected to terminal 11, and the open end of winding 5 being grounded. Terminal 12 is connected to one side of secondary winding 9 of transformer 8, the other side of this winding being grounded.

Terminals 10, 11 and 12 are connected respectively to electronic switches 13, 14 and 15. Each of these switches has associated with it and is actuated by a gate, these gates being designated respectively 16, 17 and 18. The outputs from switches 13, 14 and 15 are connected together and to coincidence blocking oscillator 19.

A master blocking oscillator 20 is provided and one of its outputs is supplied to gate 16. Gate 16 is connected to gate 17, and gate 17 in turn is connected to gate 18. One of the outputs of coincidence blocking oscillator 19 is supplied to off-trigger generator 21, the output of which in turn is supplied to each of gates 16, 17 and 18.

Another of the outputs of coincidence blocking oscillator 19 is supplied to data blocking oscillator 22, which is also supplied with an output of master blocking oscillator 20. Another output of master blocking oscillator 20 is supplied to reference blocking oscillator 23. The outputs of blocking oscillators 22 and 23 are furnished to and combined in a collector cathode follower unit 24, the single output of which is supplied through output cathode follower unit 25 to output terminal 26 and also to reset cathode follower unit 27. The output of the latter unit is supplied to sawtooth generator 28, the output of which is supplied to coincidence blocking oscillator 19. The output wave of generator 28 may be of any suitable form, as for example a rising exponential function of time.

In operation, when an alternating voltage is applied to terminals 6, three alternating voltages are present at terminals 10, 11 and 12 with respect to ground, the amplitudes of these voltages depending upon the position of rotor winding 2 with respect to stator windings 3, 4 and 5. In accordance with the present invention, each of these three voltages is sampled many times a second and used to determine the displacement in time of a pulse which appears at output terminal 26.

Let it first be assumed that master blocking oscillator 20 is in operation at the desired repetition rate, as for example 2000 cycles per second. This oscillator is so constructed that there is a definite time interval between the leading and trailing edges of each output pulse, as for example 8 microseconds. The output wave is represented by curve 31 of Fig. 2.

The leading edge of each pulse from master blocking oscillator 20 actuates data blocking oscillator 22 to produce a pulse represented by pulses 32a and 32b of curve 32 in Fig. 2. Each of these pulses is supplied to collector cathode follower unit 24, after passing through output cathode follower unit 25, becomes the first pulse of a synchronizing doublet. In addition, each pulse from collector cathode follower unit 24 is supplied to reset cathode follower unit 27, which in turn serves to reset sawtooth generator 28, as indicated by portion 33a of curve 33 in Fig. 2.

The trailing edge of each pulse from master blocking oscillator 20 actuates reference blocking oscillator 23 to produce a corresponding pulse, shown in curve 34 of Fig. 2, which is supplied to collector cathode follower unit 24. After passing through output cathode follower unit 25, each of these pulses becomes the second pulse of a synchronizing doublet appearing at output terminal 26. The same pulse at the output of collector cathode follower unit 24 is also supplied to reset cathode follower unit 27, which again resets sawtooth generator 28, the latter unit thereafter presenting a rising sawtooth wave to coincidence blocking oscillator 19, as indicated by portions 33b of curve 33.

The trailing edge of each pulse from master blocking oscillator 20 opens gate 16, which in turn renders switch 13 conductive. This permits the voltage between terminal 10 and ground to be supplied to coincidence blocking oscillator 19, in which it is combined with the output voltage of sawtooth generator 28. When the sum of these two voltages exceeds a predetermined value, coincidence blocking oscillator 19 is tripped to produce pulse 35a of curve 35. The output of coincidence blocking oscillator 19 actuates off-trigger generator 21, the output of which, indicated by curve 36, is supplied to gate 16 to cause this gate to close. This renders switch 13 non-conductive and the sampling of the voltage at terminal 10 is thus completed.

The action of coincidence blocking oscillator 19 which causes the closing of gate 16, in the manner just described, actuates data blocking oscillator 22, causing it to produce a pulse which is indicated by pulse 32c in curve 32. This pulse, after passing through collector cathode follower unit 24 and output cathode follower unit 25, forms a first intelligence pulse at output terminal 26. The same output of collector cathode follower unit 24 also actuates reset cathode follower unit 27, which in turn resets sawtooth generator 28 as before, and a new sawtooth wave begins to rise at the input to coincidence blocking oscillator 19, as indicated by portions 33c of curve 33.

The closing of gate 16 causes gate 17 to open, rendering switch 14 conductive and thus permitting the voltage at terminal 11 to reach coincidence blocking oscillator 19. Once again, off-trigger generator 21 is actuated as soon as the sum of the voltage at terminal 11 and the output voltage of sawtooth generator 28 exceeds a given value, turning gate 17 off and rendering switch 14 non-conductive. The same cycle of events is now repeated by gate 18 and switch 15 for sampling the voltage appearing at terminal 12.

Upon the closing of gate 18, sawtooth generator 28 is reset as above described. Although the output of this generator rises, coincidence blocking oscillator 19 cannot fire because it is supplied with no signal voltage from any of switches 13, 14 and 15 until the next cycle begins. This is true because coincidence blocking oscillator 19 is so designed that the voltage from sawtooth generator 28 alone is never sufficient to cause it to fire.

The gating voltages developed respectively by gates 16, 17 and 18 are shown by curves 37, 38 and 39 of Fig. 2. The series of pulses appearing at output terminal 26 is represented by curve 40, and will be seen to comprise a synchronizing doublet consisting of pulses 40a and 40b followed by intelligence pulses 40c, 40d and 40e. The value of the voltage between terminal 10 and ground is represented by the spacing in time between the synchronizing doublet 40a, 40b and intelligence pulse 40c. The time interval between intelligence pulses 40c and 40d corresponds with the voltage between terminal 11 and ground. The voltage between terminal 12 and ground is represented by the elapse of time between intelligence pulses 40d and 40e.

Fig. 3 shows, in schematic form, the circuit details of the coder of Fig. 1. The voltage appearing between terminal 10 and ground is applied across a resistor 41, which constitutes a portion of a voltage divider also comprising a rheostat 42 and resistors 43 and 44 in series. One terminal of rheostat 42 is connected to the positive terminal of potential source 45, the negative terminal of which is grounded, and the junction of resistors 43 and 44 is connected to control electrode 46 of the right-hand portion of vacuum tube 47, which is arranged as a cathode follower with a load resistor 48. The junction of resistors 43 and 44 is also connected to anode 49 of the left-hand portion of vacuum tube 47. The two portions of tube 47 serve as an electronic switch (represented by block 13 in Fig. 1). When this switch is "closed" or conducting, the voltage across load resistor 48 is substantially the same as that at control electrode 46, and hence is proportional to the voltage between terminal 10 and ground (plus a portion of the voltage of source 45).

The voltage across load resistor 48 is applied, by means of resistor 50, to control electrode 51 of the right-hand portion of vacuum tube 52, which functions as the coincidence blocking oscillator 19 of Fig. 1. Also applied to control electrode 51, through resistor 53, is the output voltage of sawtooth generator 28 of Fig. 1, comprising vacuum tube 54. The time constant of this generator is adjusted to a desired value, as for example 90 microseconds, by means of trimmer capacitor 55. Cathode 111 of vacuum tube 52 is connected to the junction of resistors 112 and 113 in series across potential source 45, so that it is maintained at a positive potential higher than either that developed across resistor 48 or the output potential of sawtooth generator 28. When both of the latter two potentials are present, however, control electrode 51 reaches such a potential relative to cathode 111 that coincidence blocking oscillator 19 trips or fires and produces a pulse at the secondary winding of output transformer 56. The manner in which the firing of coincidence blocking oscillator 19 acts upon switches 13, 14 and 15 (Fig. 1) will be explained later.

Master blocking oscillator 20 (Fig. 1) comprises the left-hand portion of vacuum tube 52, and is of the single-swing type. Its grid-circuit time constant is adjusted by means of rheostat 57 to obtain the desired repetition rate, as for example 2000 cycles per second. An inductance coil 58 is connected between cathode 59 and ground, its purpose being so to lengthen the positive half of the grid cycle that its leading edge may be used to place the first pulse (40a in Fig. 2) of the synchronizing doublet, and its trailing edge to place the second pulse 40b of the doublet (Fig. 2) a desired interval later, as for example 8 microseconds.

The voltage developed at control electrode 60 of master blocking oscillator 20 is amplified and inverted by the left-hand portion of vacuum tube 61, the output voltage of which is applied to anode 62 of the right-hand portion of vacuum tube 63, which functions as data blocking oscillator 22 (Fig. 1). This output voltage is also applied to a differentiating network comprising capacitor 64 and resistors 65 and 66. Resistors 65 and 66 are connected in series between ground and the negative terminal of potential source 67, the positive terminal of which is grounded. The junction of resistors 65 and 66, to which capacitor 64 connects, is also connected to control electrode 68 of the left-hand portion of vacuum tube 63 which functions as reference blocking oscillator 23 of Fig. 1. Since a blocking oscillator may be triggered by a positive pulse applied to its control electrode or with a negative pulse applied to its anode, it is apparent that data blocking oscillator 22 will fire at a time corresponding to the rise of the first half of the grid cycle of master blocking oscillator 20, and reference blocking oscillator 23 will fire with the fall of the same first half grid cycle.

Vacuum tube 69 functions as collector cathode follower 24 (Fig. 1). Control electrode 70 is connected, through resistor 71, to the grid circuit of reference blocking oscillator 23; and control electrode 72, through resistor 73, connects to the input circuit of data blocking oscillator 22. Since cathodes 74 and 75 are connected together and grounded through common load resistor 76, vacuum tube 69 functions to combine or add the pulses from both oscillators. When both oscillators are non-operative, cathodes 74 and 75 are at a small positive potential. The firing of either oscillator causes, first, an increase in its grid potential which appears at cathodes 74 and 75 as a positive voltage, and second, a decrease in its grid potential below cutoff of vacuum tube 69. Since the collector cathode follower cannot follow these negative excursions of the oscillator grid voltages, the output voltage developed across resistor 76 consists of a series of pulses of high positive value, the series being repeated at the repetition rate of master blocking oscillator 20. This output voltage is applied to control electrode 77 of the right-hand portion of vacuum tube 78, which functions as output cathode follower 25 having output terminal 26 (Fig. 1).

The left-hand portion of vacuum tube 78 serves as reset cathode follower 27 of Fig. 1. Its control electrode 79 is coupled to control electrode 77 of output cathode follower 25 by means of capacitor 80, so that positive pulses appearing at output terminal 26 are reproduced at cathode 81, which in turn is coupled by capacitor 82 to control electrode 83 of the left-hand portion of vacuum tube 54. This tube functions as sawtooth generator 28 (Fig. 1). Anode 84 is connected to the positive terminal of potential source 45 by means of resistor 85, and is by-passed to ground by capacitors 55 and 86 in parallel. Reset pulses applied through capacitor 82 drive control electrode 83 heavily positive, thereby thoroughly discharging capacitors 55 and 86 and momentarily reducing the potential of anode 84 to a value closely approaching zero. Thus the sawtooth generator is reset.

After resetting, control electrode 83 returns to a high negative value, beyond the cut-off value of the tube, and the potential of anode 84 rises exponentially and unimpeded towards the potential of source 45. This negative bias voltage is maintained by grid-circuit rectification which takes place during the resetting pulses. The right-hand portion of vacuum tube 54 serves as a cathode follower to reproduce, across its output resistor 87, the sawtooth voltage developed at anode 84.

Vacuum tube 88 functions as gate 16 (Fig. 1). This tube is connected in an Eccles-Jordan trigger circuit, so that current flows in only one portion of the tube at a time. A negative pulse applied to one control electrode causes the corresponding portion of the tube to become non-conductive and the other portion conductive, and vice versa. Control electrode 89 of the left-hand portion of vacuum tube 88 is directly connected to control electrode 90 of the left-hand portion of switching vacuum tube 47, and the common connection is coupled by means of resistor 91 and capacitor 92 to the input circuit of the left-hand portion of vacuum tube 52, which functions as master blocking oscillator 20 (Fig. 1). When a negative voltage pulse is applied through capacitor 92, control electrodes 89 and 90 become negative with respect to ground, so that the left-hand portion of vacuum tube 47 is cut off. This permits the right-hand portion of vacuum tube 47, which functions as a cathode follower, to conduct, so that the "switch" is effectively closed or conductive. When a negative voltage pulse is applied to control electrode 93 of the right-hand portion of vacuum tube 88, in a manner to be described subsequently, control electrode 89 rises to a small positive voltage relative to ground, causing control electrode 90 of tube 47 to go positive and the left-hand portion of vacuum tube 47 to become conductive, so that the "switch" is effectively open or non-conductive.

The right-hand portion of vacuum tube 61 functions as the off-trigger generator 21 of Fig. 1. Its control electrode 94 is coupled by means of capacitor 95 to the input circuit of coincidence blocking oscillator 20, so that a positive pulse is applied to electrode 94 when the oscillator fires at the end of a sampling process. The right-hand portion of vacuum tube 61 inverts and amplifies this pulse, the resultant negative pulse being supplied to control electrode 93 of vacuum tube 88 by means of capacitor 95, and to anode 62 of vacuum tube 63 through capacitor 96.

All the apparatus directly associated with the channel supplied by terminal 10 has now been discussed. Vacuum tubes 97 and 98 serve as switches 14 and 15 of Fig. 1, in a manner similar to that described in connection with vacuum tube 47, the right-hand portions of these three tubes having common cathode resistor 48. Likewise, vacuum tubes 99 and 100, functioning as gates 17 and 18 (Fig. 1), are analogous, with respect to terminals 11 and 12, to vacuum tube 88, serving as gate 16, relative to terminal 10.

To secure a sequential operation of the three gates, control electrode 101 of vacuum tube 99 is coupled to anode 102 of vacuum tube 88 by means of capacitor 103 and resistor 104, and control electrode 105 of vacuum tube 100 is coupled to anode 106 of vacuum tube 99 through capacitor 107 and resistor 108. Thus, when a negative voltage pulse is applied to control electrode 93 through capacitor 95, gate 16 is turned off and anode 102 of vacuum tube 88 falls in potential. This produces a negative pulse on control electrode 101, turning gate 17 on after a delay of a few microseconds due to resistor 104. When gate 17 in turn is turned off by a negative pulse through capacitor 109, the fall in potential at anode 106 turns on gate 18 after a small delay interval due to resistor 108. When gate 18 is turned off by a negative pulse through capacitor 110, all the gates remain off.

A complete sequence of the coding operation will now be described, reference being made to Figs. 1, 2 and 3 of the drawings. The cycle starts when the leading edge of the output pulse (curve 31) of master blocking oscillator 20 triggers data blocking oscillator 22, forming first pulse 40a of the synchronizing doublet. Data blocking oscillator 22 resets sawtooth generator 28 by means of collector cathode follower 24 and reset cathode follower 27 (portion 33a of curve 33).

After a predetermined interval, as for example 8 microseconds, the trailing edge of the output pulse (curve 31) of master blocking oscillator 20 triggers reference blocking oscillator 23 forming second pulse 40b of the synchronizing doublet. The output of master blocking oscillator 20 is differentiated by elements 91, 92 and 111, and applied to control electrode 89 of gate 16. This in turn opens gate 16 (curve 37) and renders switch 13 conductive so that the voltage at input terminal 10 is sampled. In the meantime, the output voltage (curve 33) of sawtooth generator 28 has risen slightly. Reference blocking oscillator 23 resets sawtooth generator 28 to zero again by means of collector cathode follower 24 and reset cathode follower 27.

The output voltage of sawtooth generator 28 again rises (portion 33b of curve 33) until the total voltage between control electrode 51 of vacuum tube 52, comprising coincidence blocking oscillator 19, and ground reaches a predetermined value, as for example 143 volts. The time interval required to reach this value depends upon the instantaneous voltage being sampled at terminal 10, and may for example vary from 20 to 142 microseconds. Coincidence blocking oscillator 19 fires, producing an off-trigger voltage pulse (curve 36) through off-trigger generator 21, and intelligence pulse 40c by means of data blocking oscillator 22, collector cathode follower 24, and output cathode follower 25. Thus intelligence pulse 40c follows second synchronizing pulse 40b by a time interval whose duration is a function of the instantaneous voltage at terminal 10. Gate 16 (curve 37) is turned off by the off-trigger voltage (curve 36), thereby rendering switch 13 non-conductive and bringing to an end the sampling of the voltage at terminal 10. Very shortly after gate 16 is turned off, gate 17 (curve 38) is turned on, thus rendering switch 14 conductive and permitting the sampling of the voltage at terminal 11 to begin. Sawtooth generator 28 is reset to zero by data blocking oscillator 22 through collector cathode follower 24 and reset cathode follower 27.

Once again, the output voltage of sawtooth generator 28 rises (portion 33c of curve 33) until the total voltage at control electrode 51 reaches the above-mentioned predetermined value. The time interval required to reach this value is dependent upon the instantaneous voltage being sampled at terminal 11, and may for example vary from 20 to 142 microseconds. Coincidence blocking oscillator 19 fires, producing an off-trigger voltage pulse (curve 36) through off-trigger generator 21, and intelligence pulse 40d by means of data blocking oscillator 22, collector cathode follower 24, and output cathode follower 25. Intelligence pulses 40c and 40d are thus separated by a time interval whose duration is a function of the instantaneous voltage at terminal 11. Gate 17 (curve 38) is turned off by the off-trigger voltage (curve 36), so that switch 14 is rendered non-conductive and the sampling of the voltage at terminal 11 ended. Almost immediately after gate 17 is turned off, gate 18 (curve 39) is turned on, so that switch 15 becomes conductive and the sampling of the voltage at terminal 12 is permitted to begin. Sawtooth generator 28 is reset to zero by data blocking oscillator 22 through collector cathode follower 24 and reset cathode follower 27.

Once more, the output voltage of sawtooth generator 28 rises (portion 33d of curve 33) until the total voltage at control electrode 51 reaches the above-mentioned predetermined value. The time interval required to reach this value is dependent upon the instantaneous voltage being sampled at terminal 12, and may for example vary from 11 to 203 microseconds. (The range here given by way of example is different from that given above in connection with the sampling of the voltage at terminals 10 and 11 since, in the arrangement shown in Fig. 1, the peak value of the reference voltage developed across winding 9 of transformer 8 may exceed the peak values of the voltages applied respectively to terminals 10 and 11.) Coincidence blocking oscillator 19 fires, producing an off-trigger voltage pulse (curve 36) through off-trigger generator 21, and intelligence pulse 40e, by means of data blocking oscillator 22, collector cathode follower 24 and output cathode follower 25. Thus intelligence pulse 40e follows intelligence pulse 40d by a time interval whose duration is a function of the instantaneous voltage at terminal 12.

Gate 18 (curve 38) is turned off by the off-trigger voltage (curve 36), so that switch 15 is rendered non-conductive and the sampling of the voltage at terminal 12 ended. The output voltage of sawtooth generator 28 continues to rise and would reach a high value, as for example 250 volts, after a long interval of time. However, since no switch is conductive at this time, this voltage is insufficient to cause the coincidence blocking oscillator to fire. After gate 18 is turned off and switch 15 thus rendered non-conductive, all the gates remain turned off and all the switches remain non-conductive until the next sampling cycle is started. It is important to note that, following a circuit disturbance, as for example a momentary interruption of power, only one sampling cycle is required to restore an improper gate or switch condition to normal.

Fig. 4 is a block diagram of the decoder and associated apparatus. Input signals, from the coder of Figs. 1 and 3, are applied to input terminal 115 and pass through azimuth separator unit 116. The output of this unit comprises a series of pulses such as shown by curve 250 of Fig. 5. These pulses are supplied to reset blocking oscillator 117, which in turn actuates off-trigger pulse former 118 and furnishes positive trigger voltages to sawtooth generator 119.

Off-trigger pulse former 118 provides negative trigger voltages (curve 251, Fig. 5), which are supplied to gates 120, 121 and 122 having associated with them switches 123, 124 and 125, respectively. (The latter six units are similar respectively to units 16, 17, 18, 13, 14 and 15 of the coder of Fig. 1). The output of unit 118 is also supplied to synchronizing gate 126 and to synchronizing switch 127.

Sawtooth generator 119 has an output waveform (curve 252, Fig. 5) which is substantially the same function of time as is that of sawtooth generator 28 (Fig. 1) of the coder. This output is supplied to evaluators 128, 129 and 130, which are respectively under the control of switches 123, 124 and 125. The evaluator outputs are connected to terminals 131, 132 and 133, respectively, which in turn supply low-pass filter and amplifier units 134, 135 and 136. Curve 253 of Fig. 5 shows the output of evaluator 128 of Fig. 4 by way of example.

A receiving selsyn transformer 137 is provided, having a rotor winding 138 and three stator windings 139, 140 and 141. The stator windings are shown as being Y-connected, the open end of winding 139 being connected to the output of unit 134, that of winding 140 to the output of unit 135, and the open end of winding 141 being grounded. The output of unit 136 is connected to one side of primary winding 142 of a transformer 143, the other side being grounded. Secondary winding 144 of transformer 143 is connected to rotor winding 138.

In operation, synchronizing gate 126 and synchronizing switch 127 are actuated by the first two pulses (250a and 250b in Fig. 5) of each sampling cycle comprising the synchronizing doublet, and prepare for operation gates 120, 121 and 122 by closing any one of these gates which happens to be open. Each synchronizing pulse also resets sawtooth generator 119, which has a decay time less than the time interval between the synchronizing pulses, as shown by portions 252a of curve 252 in Fig. 5. Succeeding intelligence pulses (250c, 250d and 250e of Fig. 5) reset sawtooth generator 119, in each instance after its output voltage has built up to a value dependent upon the time interval which has elapsed since the preceding pulse occurred.

Gate 120 is opened by the second synchronizing pulse (250b in Fig. 5) and remains open until the first intelligence pulse (250c in Fig. 5) fires reset blocking oscillator 117, causing off-trigger pulse former 118 to produce a negative pulse which closes gate 120. When gate 120 closes, gate 121 is caused to open. It remains open until closed by the occurrence of the second intelligence pulse (250d in Fig. 5). This closes gate 121 and opens gate 122. The latter gate is closed by the third intelligence pulse (250e in Fig. 5), and all the gates now are closed and remain closed until gate 120 is again opened by the synchronizing doublet of the next sampling cycle. The operation of these gates is shown graphically by curves 254, 255 and 256, respectively, of Fig. 5.

Figure 6:
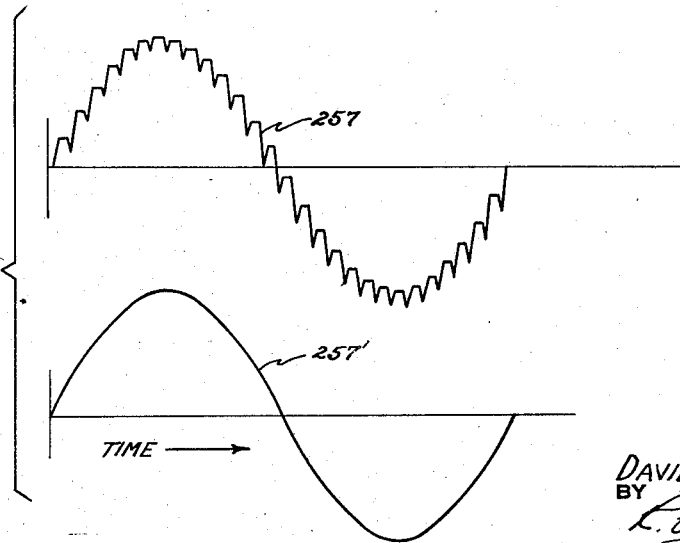

When any of gates 120, 121 and 122 is open, as described above, the corresponding one of switches 123, 124 and 125 is rendered conductive. This in turn causes the corresponding one of evaluators 128, 129 and 130 to be connected to the output of sawtooth generator 119. Let it be assumed, for example, that gate 120 has just been opened by synchronizing pulse 250b. Switch 123 is thus conductive and causes the output voltage of sawtooth generator 119 to be applied to evaluator 128. This voltage rises until intelligence pulse 250c occurs and resets sawtooth generator 119, and thus the voltage reaches a value which is a function of the time-spacing between pulses 250b and 250c. As these events are repeated for a plurality of sampling cycles, the output voltage of evaluator 128, appearing at terminal 131, consists of successive peaks of the interrupted sawtooth voltage (curve 257 Fig. 6) and contains, as a fundamental component obtained by filtering, a duplicate (curve 257', Fig. 6) of the voltage applied to terminal 10 in Fig. 1.

Since the voltages developed at terminals 132 and 133 are likewise duplicates, after filtering, of the voltages applied respectively to terminals 11 and 12 in Fig. 1, it will be readily apparent that the rotor of receiving selsyn transformer 137 will reproduce the rotational displacements of the rotor of transmitting selsyn transformer 1 in Fig. 1. It will be equally obvious that the system of the present invention is not limited to the transmitting and reproduction of three selsyn voltages, in the manner hereshown and described by way of example, but may be employed with fully equivalent results to transmit a plurality of voltages, regardless of their source, and reproduce them at the receiving end with proper relative instantaneous values.

Reference is now made to Fig. 7, which shows, in schematic form, the circuit details of the decoder of Fig. 4. Input terminal 115 is connected to the control electrode 145 of a vacuum tube 146, which functions as azimuth separator 116 of Fig. 4. Tube 146 is so biased as to respond only to positive excursions applied to control electrode 145, such signals rendering the tube conductive. Negative potentials applied to control electrode 145 have no appreciable effect on the operation of tube 146. Thus, since the desired input signals comprise positive pulses (curve 250, Fig. 5), they are effectively separated from any negative voltages which may also be present at terminal 115.

The left-hand portion of vacuum tube 147 functions as reset blocking oscillator 117 of Fig. 4. Anode 148 of vacuum tube 146 is connected to anode 149 of vacuum tube 147. On each signal pulse, tube 146 draws heavy anode current and thus causes the oscillator to fire. The constants of the oscillator are so chosen that its oscillations will decay to zero in a time interval less than that between successive pulses, so it fires on every pulse. Positive pulses are developed across grid winding 150 of coupling transformer 151 when the oscillator fires, and are supplied through lead 152 to reset the sawtooth generator 119 (Fig. 4), as described below.

The right-hand portion of vacuum tube 147 serves as off-trigger pulse former 118 of Fig. 4. Control electrodes 153 and 154 are connected together, so that large negative pulses are developed at anode 155 of tube 147 when the oscillator including the left-hand portion of this tube fires. These pulses, shown by curve 251 in Fig. 5, are supplied by means of lead 156 to gates 120, 121 and 122, synchronizing gate 126, and synchronizing switch 127 (Fig. 4).

Sawtooth generator 119 (Fig. 4) comprises the left-hand portion of vacuum tube 157, the control electrode 158 of which is supplied with positive pulses from reset blocking oscillator 117. By means of variable capacitor 159, the time constant of sawtooth generator 119 may be adjusted to correspond with that of sawtooth generator 28 of the coder (Fig. 1), so that an accurate reproduction of the transmitted signal voltages will be obtained. Each time sawtooth generator 119 is reset by a positive pulse from reset blocking oscillator 117, its control electrode 158 is heavily biased by grid-circuit conduction. The right-hand portion of vacuum tube 157 functions as a cathode follower which is driven by sawtooth generator 119 without placing an appreciable load thereon. The sawtooth output voltage developed across cathode resistor 160 is supplied, by means of lead 161, to evaluators 128, 129 and 130 (Fig. 4). This voltage is shown by curve 252 of Fig. 5.

Vacuum tube 162 functions as gate 120 (Fig. 4). This tube is connected as an Eccles-Jordan trigger circuit, so that current flows in only one portion of the tube at a time. A negative pulse applied to one control electrode causes the corresponding portion of the tube to become non-conductive and the other portion conductive, and vice versa. Control electrode 163 of the left-hand portion of vacuum tube 162 is directly connected to control electrode 164 of the left-hand portion of switching vacuum tube 165 and the common connection in turn is connected to electrodes 166 and 167 of the right-hand portion of vacuum tube 168, which functions as synchronizing switch 127 (Fig. 4) in a manner to be described later. When a negative voltage pulse is applied by virtue of the last-mentioned connection, control electrodes 163 and 164 become negative with respect to ground, so that the normally conducting left-hand portion of vacuum tube 165 is cut off and the potential of its anode 169 rises to the instantaneous value of the sawtooth voltage developed across resistor 160 as previously explained. When the left-hand portion of vacuum tube 165 is conducting, lead 161 carrying the sawtooth voltage is effectively grounded through resistor 170.

Anode 169 of vacuum tube 165 is directly connected to control electrode 171 of the left-hand portion of vacuum tube 172, which functions as evaluator 128 (Fig. 4). When this portion of this tube is conductive, holding or storage capacitor 173 (connected to its cathode 176) is charged substantially to the potential of grid 171. Thus this portion of tube 172 can be considered as a clamper circuit for charging the capacitor 173. The anode 175 of vacuum tube 172 is connected to a source of potential 174. Cathode 176 is also connected to control electrode 177 of the right-hand portion of vacuum tube 172, which functions as a cathode follower. Control electrode 178 of the right-hand portion of gating vacuum tube 162, which is coupled to off-trigger pulse lead 156 by means of capacitor 189, is also connected to control electrode 179 of the right-hand portion of switching vacuum tube 165. Anode 180 of this tube portion is connected by means of resistor 181 to control electrode 177 of vacuum tube 172. When the right-hand portion of switching vacuum tube 165 is rendered conductive by the action of gating tube 162, storage capacitor 173 is discharged through resistor 181. Thus this portion of tube 165 can be considered as a clamper circuit for discharging the capacitor 173. The resultant output voltage, as developed across resistor 182, appears at output terminal 131. How the value of this voltage is determined will now be explained.

Let it be assumed that capacitor 173 has been charged through the left-hand portion of vacuum tube 172, as described above. When a synchronizing pulse renders the left-hand portion of switching vacuum tube 165 non-conductive, its right-hand portion becomes conductive. At this instant, the sawtooth generator output voltage, developed across resistor 160, begins to rise. While the magnitude of this voltage is less than the voltage drop across capacitor 173 due to its charge, capacitor 173 discharges through resistor 181. When the sawtooth voltage reaches a value which exceeds that across the capacitor, however, the flow of current through the capacitor reverses and the capacitor is charged, so that the voltage across it rises with the sawtooth voltage.

The voltage across storage capacitor 173 is reproduced across resistor 182, due to the action of the right-hand portion of vacuum tube 172 as a cathode follower, and hence appears at output terminal 131. Thus the output voltage comprises a series of step voltages (curve 257, Fig. 6) the value of each of which depends upon the extent to which the sawtooth generator voltage is permitted to rise before it is reset by the next signal pulse. An envelope of these individual step voltages (curve 257', Fig. 6), therefore, corresponds closely with the original input voltage applied to terminal 10 of the coder (Fig. 1).

All the apparatus directly associated with the channel which supplies output terminal 131 has now been discussed. Gating vacuum tube 183, switching vacuum tube 184 and evaluator vacuum tube 185, all associated with output terminal 132, are respectively analogous to vacuum tubes 162, 165 and 172, already described in connection with the channel of output terminal 131, and serve respectively as gate 121, switch 124 and evaluator 129 of Fig. 4. Likewise, vacuum tubes 186, 187 and 188 respectively perform gating, switching and evaluating functions in the channel which supplies output terminal 133, and hence correspond respectively to gate 122, switch 125 and evaluator 130 of Fig. 4.

To secure a sequential operation of the three channels, control electrode 190 of vacuum tube 183 is coupled to anode 191 of vacuum tube 162 by means of capacitor 192 and resistor 193, and control electrode 194 of vacuum tube 186 is coupled to anode 195 of vacuum tube 183 through capacitor 196 and resistor 197. Thus, when a negative voltage pulse is applied to control electrode 178 through capacitor 189, gate 120 is turned off and anode 191 of vacuum tube 162 falls in potential. This produces a negative pulse on control electrode 190, turning gate 121 on after a delay of a few microseconds due to resistor 193. When gate 121 in turn is turned off by a negative pulse through capacitor 198, the fall in potential at anode 195 turns on gate 122 after a small delay interval due to resistor 197. When gate 122 is turned off by a negative pulse through capacitor 199, all the gates remain off.

The two portions of vacuum tube 200, which comprises synchronizing gate 126 (Fig. 4), are connected as a one-shot multivibrator, the right-hand portion is normally conducting. This is the steady-state condition. If a negative pulse is applied to control electrode 201 from off-trigger pulse lead 156 through capacitor 202, conduction is transferred to the left-hand portion and the synchronizing gate may be said to be turned on. The latter portion continues to conduct for an interval dependent upon the values of resistance and capacitance selected, and then conduction is transferred back to the right-hand portion until another negative pulse is applied to control electrode 201. By so selecting the circuit constants that the interval during which the left-hand portion of vacuum tube 200 is conductive exceeds the time interval between the signal pulses comprising the synchronizing doublet (pulses 250a and 250b of Fig. 5), synchronizing gate 126 will be turned on by pulses 250a, 250c, 250d, and 250e, but not by pulse 250b. This is illustrated by curve 258 of Fig. 5.

The left-hand portion of vacuum tube 168, which serves as synchronizing switch 127 (Fig. 4), functions as a cathode follower. Its control electrode 203 is connected to the junction of resistors 204 and 205 which are connected in series between anode 206 of the left-hand portion of vacuum tube 200 and the negative terminal of potential source 207, the positive terminal of which is grounded. Thus, when the left-hand portion of vacuum tube 200 is conducting, control electrode 203 becomes substantially negative relative to ground and cathodes 208 and 209, which are connected together, remain approximately at ground potential. Since control electrode 163 of vacuum tube 162, to which electrodes 166 and 167 of vacuum tube 168 are both directly connected, is normally substantially at ground potential, the diode comprised of the right-hand portion of vacuum tube 168 does not conduct and no negative pulse is developed and used to open gate 120 (Fig. 4). This is the situation after the occurrence of the first synchronizing pulse (250a in Fig. 5), but before the occurrence of the second synchronizing pulse (250b in Fig. 5).

Cathodes 208 and 209 of vacuum tube 168 are coupled to off-trigger pulse lead 156 by means of capacitor 210. The negative voltage pulse due to the second synchronizing pulse (250b in Fig. 5), therefore, is applied to cathodes 208 and 209, causing their right-hand portion of vacuum tube 168 to become conductive. Gate 120 (Fig. 4) is thereby turned on, and electrodes 166 and 167 of the right-hand portion of vacuum tube 168 then becomes substantially negative relative to ground.

After the occurrence of the second synchronizing pulse (250b in Fig. 5) but before the first intelligence pulse (250c in Fig. 5) occurs, synchronizing gate 126 (Fig. 4) returns to its steady-state condition. This causes control electrode 203 of vacuum tube 168, and hence cathodes 208 and 209, to assume a positive potential with respect to ground. Electrodes 166 and 167, comprising the anode of the diode portion of vacuum tube 168, are substantially negative relative to ground. Synchronizing switch 127

(Fig. 4) is therefore so biased that the negative pulse due to the first intelligence pulse (250c in Fig. 5), which is applied through capacitor 210, is insufficient to render the diode conductive, and is thus without effect. The above-described operation of the synchronizing switch is illustrated by curve 259 (Fig. 5), the portions 259a comprising the trigger pulses for gate 120 (Fig. 4), and broken line 260 representing the diode clipping potential.

The situation is similar just before the occurrence of the remaining intelligence pulses (250d and 250e in Fig. 5), so that these pulses are likewise without effect. Thus it will be apparent that gate 120 can be opened, and the resultant sequence of operations initiated, only by the occurrence of a pair of pulses having a predetermined maximum time-spacing. The sequence canot be started by a single signal pulse, nor by a pair of pulses having a time-spacing greater than the predetermined value.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination: an electron tube having a control electrode; a capacitor; a potential source; said electron tube, said capacitor and said potential source being connected in a series loop; a source of varying voltage; a first electronic switch connected across said capacitor; a second electronic switch in series with a resistor, said series connected second electronic switch and resistor being connected effectively in shunt with said varying-voltage source; means for applying said varying voltage to said control electrode, said means including means coupling said control electrode to a circuit point between said resistor and said second electronic switch; interconnections between said first and second electronic switches whereby one of said electronic switches is non-conductive while the other of said electronic switches is conductive, and vice versa; means for reversing said conductivity conditions at a desired instant; and means for utilizing the voltage developed across said capacitor.

2. In combination: an electron tube having a control electrode; a capacitor; a potential source; said electron tube, said capacitor and said potential source being connected in a series loop; a source of substantially sawtooth voltage; a first electronic switch connected across said capacitor; a second electronic switch in series with a resistor, said series-connected second electronic switch and resistor being connected effectively in shunt with said sawtooth-voltage source; means for applying said sawtooth voltage to said control electrode, said means including means coupling said control electrode to a circuit point between said resistor and said second electronic switch; interconnections between said first and second electronic switches whereby one of said electronic switches is non-conductive while the other of said electronic switches is conductive, and vice versa; means for reversing said conductivity conditions at a desired instant; and means for utilizing the voltage developed across said capacitor.

3. In combination: a first electron tube having a control electrode; a capacitor; a potential source; said electron tube, said capacitor and said potential source being connected in a series loop; a source of varying voltage; a second electron tube having an anode; means for applying said varying voltage to said control electrode, said means including means comprising a resistor connected in series with said second electron tube connected across said source of varying voltage, and a connection from said anode to said control electrode; a third electron tube connected across said capacitor; means for rendering said second electron tube conductive while said third electron tube is non-conductive, and vice versa; means for reversing said conductivity conditions at a desired instant; and means for utilizing the voltage developed across said capacitor.

4. In combination: a first electron tube having a control electrode; a capacitor; a potential source; said electron tube, said capacitor and said potential source being connected in a series loop; a source of substantially sawtooth voltage; a second electron tube having an anode; means for applying said sawtooth voltage to said control electrode, said means including means comprising a resistor connected in series with said second electron tube connected across said source of sawtooth voltage, and a connection from said anode to said control electrode; a third electron tube connected across said capacitor; means for rendering said second electron tube conductive while said third electron tube is non-conductive, and vice versa; means for reversing said conductivity conditions at a desired instant; and means for utilizing the voltage developed across said capacitor.

5. Apparatus for producing a voltage which is a predetermined function of the time interval between two successive input pulses, comprising: a storage capacitor; a first clamper circuit including a grid controlled vacuum tube having the storage capacitor connected in series with the cathode thereof for charging the capacitor; means for generating a voltage that increases in potential as a function of time, said means being triggered by the first of said two successive input pulses; a second clamper circuit including a grid controlled vacuum tube having the plate-cathode circuit thereof connected in shunt with the storage capacitor for discharging the capacitor; gating means coupled to the control grid of the vacuum tube in said second clamper circuit, said gating means biasing the vacuum tube of the second clamper conductive during the interval between said successive input pulses; and means responsive to said gating means for coupling the output of said voltage generating means to the control grid of the vacuum tube in said first clamper circuit during the interval between said successive input pulses.

6. Apparatus for producing a voltage which is a predetermined function of the time interval between two successive input pulses, comprising a capacitor, a unilateral electron discharge device having a pair of electrodes, means for connecting said capacitor to one electrode of said device, a source of sawtooth voltage, said source being triggered by the first of said two successive input pulses, gating means responsive to the first of said pulses for producing a gating signal during the interval between said successive pulses, a resistor, a first electronic switch responsive to said gating signal and connected in series with said resistor for discharging said capacitor through said resistor in response to said gating signal, means for connecting said series-connected resistor and first electronic switch in shunt with said capacitor, and a second electronic switch responsive to said gating signal and connected between said source and said other electrode of said device for coupling said source to said other electrode in response to said gating signal.

7. In combination: a capacitor; a unilateral electron discharge device having a pair of electrodes; means for connecting said capacitor to one of said electrodes; a source of varying voltage; a first switch connected between said source and the other electrode for coupling said source to said other electrode in response to a switching signal; a resistor; a second switch connected in series with said resistor for discharging said capacitor through said resistor in response to said switching signal; means for connecting said series-connected resistor and second switch in shunt with said capacitor; and means responsive to another signal for permitting said switching signal to effect said switches as aforesaid.

8. A combination as in claim 7 wherein said source of varying voltage comprises a source of sawtooth voltage.

9. A combination as in claim 8 including means for triggering said source simultaneously with the start of said switching signal.

10. In combination: an electron discharge device having a control electrode; a capacitor; a potential source; said electron device, said capacitor and said potential source being connected in a series loop; a source of varying voltage; means for applying said varying voltage to said control electrode; a first switch connected across said capacitor; a second switch in series with a resistor, said series connected second switch and resistor being connected effectively in shunt with said varying-voltage source; means coupled to said switches for selectively providing first and second modes of operation for said switches, in the first mode one of said switches being non-conductive while the other switch is conductive, and vice versa in the second mode; means for changing from one of said modes to the other at a desired instant; and means for utilizing the voltage developed across said capacitor.

11. In combination: an electron discharge device having a control electrode; a capacitor; a potential source; said device, said capacitor and said potential source being connected in a series loop; first means for applying a varying voltage to said control electrode; a switch connected across said capacitor; means for selectively providing first and second modes of operation for the first means and the switch, in the first mode the first means being ineffective to apply a varying voltage to said control electrode when the switch is non-conductive, in the second mode the switch being conductive while the first means applies a varying voltage to said control electrode; means for changing from one to the other of said modes at a desired instant; and means for utilizing the voltage developed across said capacitor.

12. In combination: means conditionable in response to the receipt of a signal for producing, only when so conditioned, an operating signal in response to still another signal; a capacitor; a circuit for charging the capacitor and including an electron discharge device in series with the capacitor, the device having a control electrode; means for applying a varying voltage to said electrode in response to said operating signal, and a switch connected in shunt with said capacitor for discharging said capacitor in response to said operating signal.

References Cited in the file of this patent

UNITED STATES PATENTS

| | | |
|---|---|---|
| 2,420,374 | Houghton | May 13, 1947 |
| 2,532,508 | Menkhaus | Dec. 5, 1950 |
| 2,534,264 | Hoeppner | Dec. 19, 1950 |
| 2,589,807 | Higinbotham | Mar. 18, 1952 |
| 2,760,189 | McCoy et al. | Aug. 21, 1956 |